United States Patent [19]

Zhou et al.

[11] Patent Number: 5,913,924
[45] Date of Patent: Jun. 22, 1999

[54] USE OF A STORED SIGNAL TO SWITCH BETWEEN MEMORY BANKS

[75] Inventors: Jianyun Zhou; Surendra Anubolu, both of San Jose, Calif.

[73] Assignee: Adaptec, Inc., Milpitas, Calif.

[21] Appl. No.: 08/574,534

[22] Filed: Dec. 19, 1995

[51] Int. Cl.[6] .............................. G06F 12/06; G06F 13/00
[52] U.S. Cl. .................... 710/129; 710/126; 365/230.06; 365/230.08; 711/5; 711/212
[58] Field of Search ...................................... 395/306, 309, 395/474, 475, 401, 405; 364/243, 245.31, 259.9; 365/230.03; 711/5, 212

[56] References Cited

U.S. PATENT DOCUMENTS

| | | | |
|---|---|---|---|
| 4,713,759 | 12/1987 | Yamagishi et al. | 711/5 |
| 4,961,172 | 10/1990 | Shubat et al. | 365/230.06 |
| 4,987,537 | 1/1991 | Kawata | 711/212 |

*Primary Examiner*—Meng-Ai T. An
*Assistant Examiner*—Rupal D. Dharia

*Attorney, Agent, or Firm*—Omkar K. Suryadevara; Skjerven, Morrill, MacPherson, Franklin & Friel LLP

[57] ABSTRACT

A computer system includes a number of storage elements encoded with space selection instructions and at least one current-space storage element that together allow a computer to address a larger number of devices than allowed by a limited number of address terminals on the computer. Specifically, the current-space storage element is encoded with a space-selection signal that indicates a "current" address space, i.e. which one of a number of mutually exclusive address spaces is currently accessed. The space-selection signal can be changed by any device using a data bus to store signals indicative of a new address space as the "current" address space in the current-space storage element. The current-space storage element is included in a first device that can be accessed by the computer at any time by driving a signal active on a high address line of an address bus. When the signal on the high address line is inactive, the computer accesses one of a number of second devices that are located in mutually exclusive address spaces, as indicated by the current-space storage element's signal.

28 Claims, 7 Drawing Sheets

FIG. 6A

```
loop:  ─651  if((adsp_status.ADSP_LOADED==FALSE) and
              (adsp_status.ADSP_FAIL==FALSE))       659
        ─652 call  load_adsp;
adsp_idle:   do other processing if any,
             go to loop;
load_adsp:
        di
        ld   (dsp_stack),SP      //adsp_idle is on the top of stack
─653                              //save SP, (SP)=aspi_idle
        if (adsp_status.ADSP_LOADING==FALSE)   658
           call  ld_adsp_init    //YES, set ADSP_LOADING status
                                 and some parameters ─┐
        Set CS ─654                                   │
        ret                                         657
NMI_Handle:                                           │
        *. NMI_INTERRUPT  ┐                           │
        *  PROCESSING     │─610                       │
        *  INSTRUCTIONS   ┘                           │
        retn                                          │
                                                      │
─611                                                  │
                                                      │
nmi_out: .byte  0,0,0,0,0,0,0,0,0,0                   │
                                                      │
        nop ────────► NMI_Handle                      │
        jp  NMI_Handle                                │
                                                370A  │
```

```
tx:  transmit a predetermined amount of data;
     if (DSP chip malfunctions)
        adsp_status.ADSP_FAIL=TRUE;
     else
     ┌  increase the counter;
 656─┤  if counter >= the number of required
     └     adsp_status.ADSP_LOADED
              =TRUE;
     reset CS
     jmp tx
        ORG   66h     ;NMI vector
        di
        ld    SD,(adsp_stack)
                               ;Restore stack, now
─610                           ;(SP)=adsp_idle
        xor   A        ;clear A
        ld    (adsp_status,A
                               ;Reset status,i.e.,
                               ; ADSP_LOADING
                               ; ADSP_LOADED
                               ; ADSP_FAIL
        jp    nmi_out                         370B
nmi_out:
        ld    A,(c_PNP_AD)  ;Switch to
        and   7fh          ;CB0
        ld    (c_PNP_AD),A ;
        ld    (PNP_AD),A   ;
        nop
        .byte 0,0,0      ;jp NMI_Handle in
                         ;bank0
```

370

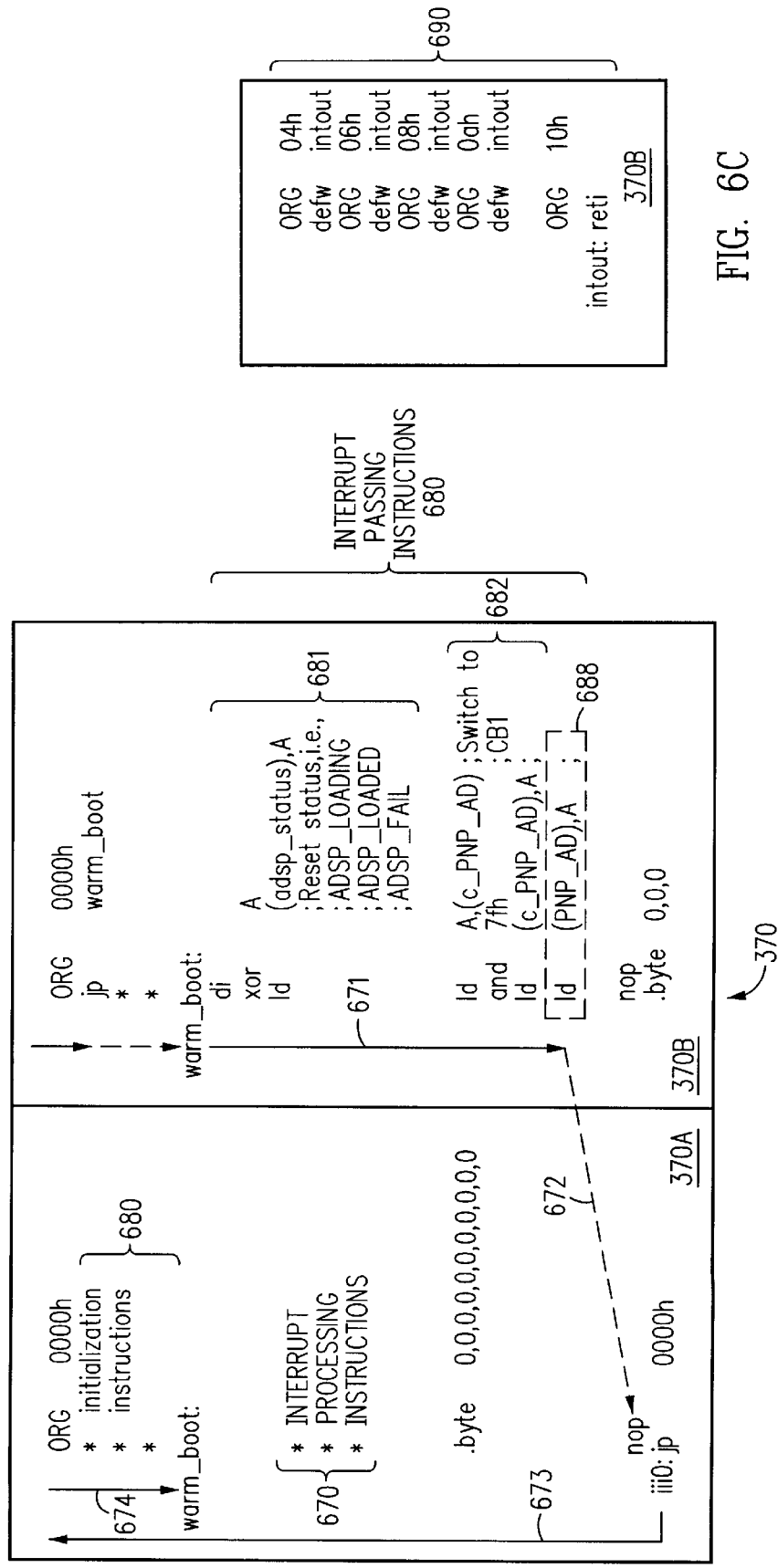

USE OF A STORED SIGNAL TO SWITCH BETWEEN MEMORY BANKS

FIELD OF THE INVENTION

This invention generally relates to switching between two or more address spaces by a computer having a limited number of address terminals. In particular, this invention relates to use of a signal stored in a storage element to switch between two or more memory banks by a microprocessor executing a program stored in the memory banks.

DESCRIPTION OF THE RELATED ART

Microprocessor system 100 (FIG. 1) illustrates a prior art microprocessor 110 having a data bus 111, an address bus 112 and a control bus 113. Microprocessor system 100 includes a main memory 140 that has a number of physically separate memory banks 140A, 140B . . . 140N (where N is the total number of memory banks). Each of memory banks 140A–140N has $2^n$ contiguously addressed physical locations with addresses from 0 to $2^n-1$.

In microprocessor system 100, microprocessor 110 has n address terminals and can generate only an n-bit address on the n lines of address bus 112. Such an n-bit address can specify any one of the $2^n$ locations within a given bank (e.g. bank 140A), but cannot specify which bank is used. A particular bank is usually addressed by an active signal on one of bank enable lines 130A–130N driven by an expansion mechanism (also called bank select logic) 120.

Typically, an expanded memory manager running in microprocessor 110 controls expansion mechanism 120 through control bus 113, and allows a real time program to use memory banks 140A–140N for data storage. Expansion mechanism 120 of FIG. 1 is not accessible through address bus 112 and data bus 111.

SUMMARY OF THE INVENTION

A computer system in accordance with this invention includes a current-space storage element that can indicate one of a number of mutually exclusive address spaces as the current address space. Devices within the current address space respond to signals on an address bus in the computer system. Specifically, the current-space storage element indicates a current address space through a space selection bus coupled to each device in each mutually exclusive address space. Only a device in the current address space as indicated by signals on the space selection bus responds to address signals on the address bus, although many devices may be located at the same address in each address space.

To start the use of a new address space as the "current" address space, any device in the computer system can update the signals stored in the current-space storage element. Such an updatable current-space storage element allows the use of a number of mutually exclusive address spaces, without the prior art need for an expansion mechanism and use of control signals to control the expansion mechanism.

In one embodiment, a data bus couples the microprocessor to every device addressed by the microprocessor. The microprocessor has n address terminals that are all coupled to corresponding n address lines, including a high address line, of the address bus. On the high address line, a signal at a first state, e.g. high, indicates a first address space, e.g., a high address space, different from a second address space, e.g., a low address space indicated when the same signal is at a second state, e.g. low.

The address bus couples a microprocessor to a first device in the first address space, and to a number of second devices in two or more second address spaces. To access the first device, the microprocessor drives a signal at the first state, also called a first state signal, on the high address line. To specify a unique address in the first device during such access, the microprocessor also drives signals on n-1 address lines, other than the high address line, that are coupled to the first device's n-1 address terminals.

The first device includes the current-space storage element that is coupled by the space selection bus to one or more address terminals of each second device. To access second devices in the second address space that is currently indicated by the current-space storage element, the microprocessor drives a signal at the second state, also called a second state signal, on the high address line. During such access, the microprocessor also drives signals on n-1 address lines other than the high address line, to specify a unique address in the second device being accessed. The n-1 address lines are coupled to the second devices' n-1 address terminals other than the address terminals coupled to the space selection bus.

Although the microprocessor can access the first address space at any time, the microprocessor can access only one of the second address spaces at a given time. In this embodiment, to switch between various second address spaces, the microprocessor executes a space select instruction and updates the signal stored in the current-space storage element. Specifically, the microprocessor drives a first state signal on the high address line, addresses the current-space storage element on the address bus, and stores through the data bus, signals indicative of the second address space to be accessed.

After executing the space select instruction, the microprocessor drives the second state signal on the high address line and simultaneously drives signals on the n-1 address lines of the address bus to specify a unique address in the second devices now indicated as current by the space selection bus.

In one variant of this embodiment, there is a single first address space and only two second address spaces. The first address space is a data space of size $2^{n-1}$ and is accessible when the high address line carries a high signal. The two second address spaces are occupied by two code banks of size $2^{n-1}$, each having a majority of the memory locations encoded with program instructions, and both accessible when the high address line carries a low signal. In this variant of the embodiment, the two code banks are formed together in a single memory chip, and the memory chip's highest address terminal is coupled to a current-space bit in a register in the data space by a space selection bus consisting essentially of a single line, also called a space selection line.

In this variant, the microprocessor can execute a space select instruction retrieved from the first code bank to switch to the second code bank, for example to continue execution of a program stored in both the code banks. After execution of the space select instruction, an instruction pointer in the microprocessor increments and the microprocessor accesses the second code bank and retrieves the next instruction from an address following the address of the recently executed space select instruction in the first code bank.

One or more storage elements in the first code bank at addresses following the space select instruction's address can be encoded with "nop" instructions, to account for any delay in update of the current-space storage element beyond a microprocessor's clock cycle.

In this variant of the embodiment, at least one interrupt service routine is encoded in the first code bank, and the microprocessor switches back to the first code bank on occurrence of the interrupt during execution of an instruction retrieved from the second code bank.

BRIEF DESCRIPTION OF THE DRAWINGS

FIGS. 6A–6C illustrate instructions encoded in storage elements of a memory chip in a variant of the embodiment of FIG. 5.

DETAILED DESCRIPTION

Figure 1:
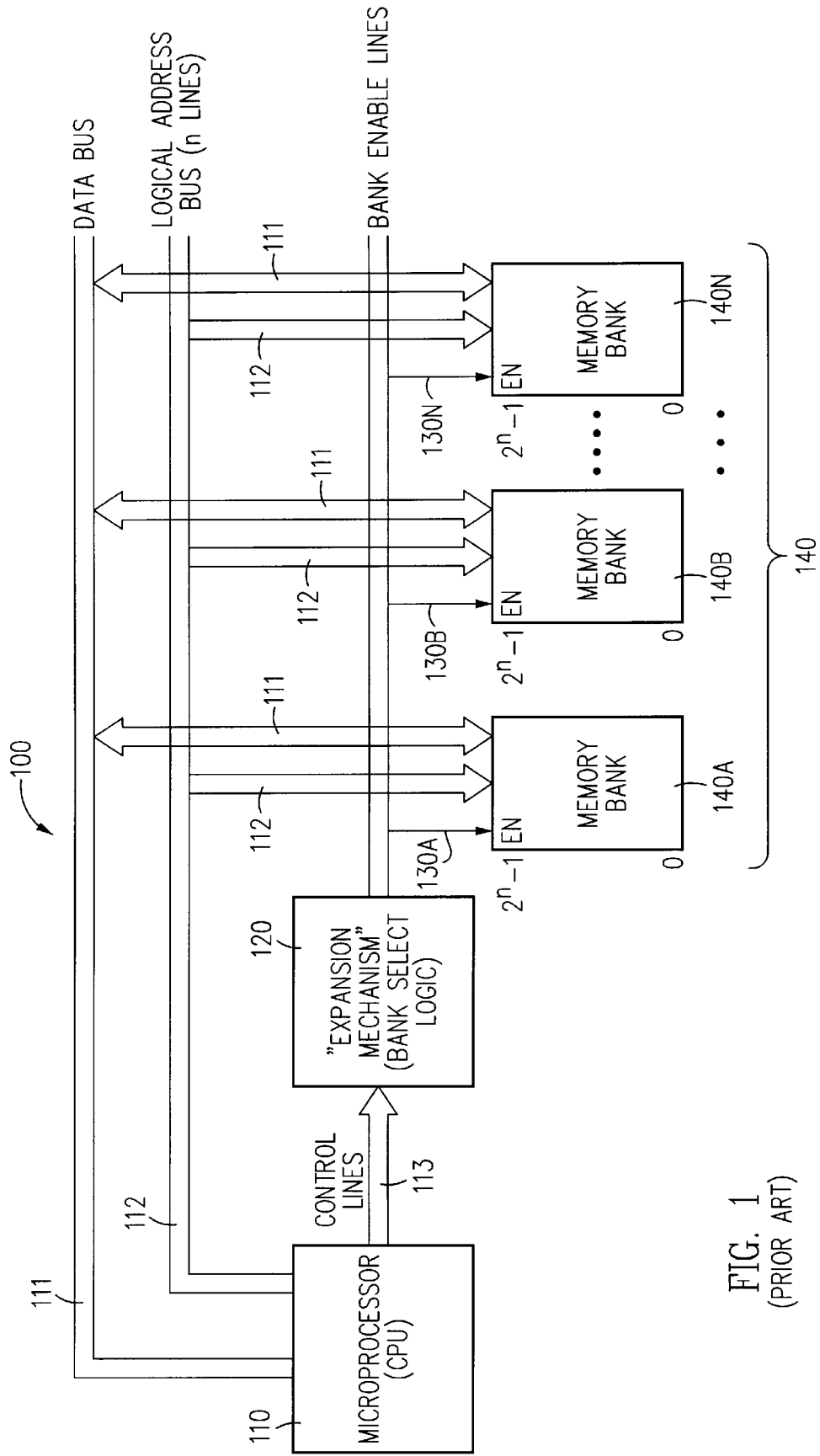
FIG. 1 illustrates a prior art microprocessor system that employs bank switching.

According to the principles of this invention, a computer system includes a current-space storage element that can indicate a "current" address space, i.e. which one of a number of mutually exclusive address spaces is currently accessed by address signals on an address bus in the system. From among various devices located at the same address in each of the mutually exclusive address spaces, only a device in the "current" address space responds to address signals on the address bus.

Any device in the computer system can use a data signal to change the signals stored in the current-space storage element, and start the use of a new address space as the "current" address space. Such a current-space storage element that is updatable by any device allows the use of mutually exclusive address spaces otherwise not permitted by a limited number of address lines in the address bus, without the prior art use of control signals and expansion mechanism.

In one embodiment of this invention, a computer system 200 includes a current-space storage element 251 that indicates through a space selection bus 260 a currently accessed address space, e.g. one of the mutually exclusive low address spaces 270A–270N, where N is the total number of low address spaces. Space selection bus 260 has M space selection lines, where $N=2^M$. Therefore, signals on space selection bus 260 and signals on the address lines of address bus 230, together can indicate a unique address in a low address space.

In this embodiment, address bus 230 couples computer 210 to at least a high address device 250 in high address space 240, and to a number of low address devices 271A–271N in the respective low address spaces 270A–270N. A highest address line 231 is coupled to each device in high address space 240, such as high address device 250, in a first manner, e.g. coupled through an inverter 232. The highest address line 231 is coupled to each device in low address spaces 270A–270N, such as low address devices 271A–271N, in a second manner, e.g., directly coupled.

To access any device in high address space 240 during execution of any instruction, computer 210 drives a signal at a first state, e.g. high, on the highest address line 231, and simultaneously drives signals on address bus 230 to identify, for example high address device 250. To access any device in a current low address space indicated by the signals on space selection bus 260, computer 210 drives a signal at a second state, e.g. low, on the highest address line 231 and simultaneously drives signals on address bus 230 to identify the device to-be-accessed.

However, to access a device in a low address space different from the current low address space, computer 210 updates the signals stored in current-space storage element 251. Specifically, computer 210 drives signals on address bus 230 to access current-space storage element 251 and also drives signals on a data bus 220 to update the signals stored in current-space storage element 251. Data bus 220 is coupled to every device in computer system 200 that communicates with computer 210. The updated signals in current-space storage element 251 in turn change the signals on space selection bus 260, and thereby switch between mutually exclusive low address spaces.

For example, to access a device in the first or last low address space 270A or 270N, computer 210 stores all low signals or all high signals respectively in current-space storage element 251. Computer 210 can store any other combination of high and low signals in current-space storage element 251 to indicate as current a low address space other than low address spaces 270A and 270N.

After such an update of current-space storage element 251, computer 210 drives a second state signal on highest address line 231, and also drives signals on address bus 230, to access a device in the low address space now indicated as current by the signals on space selection bus 260.

Figure 2:
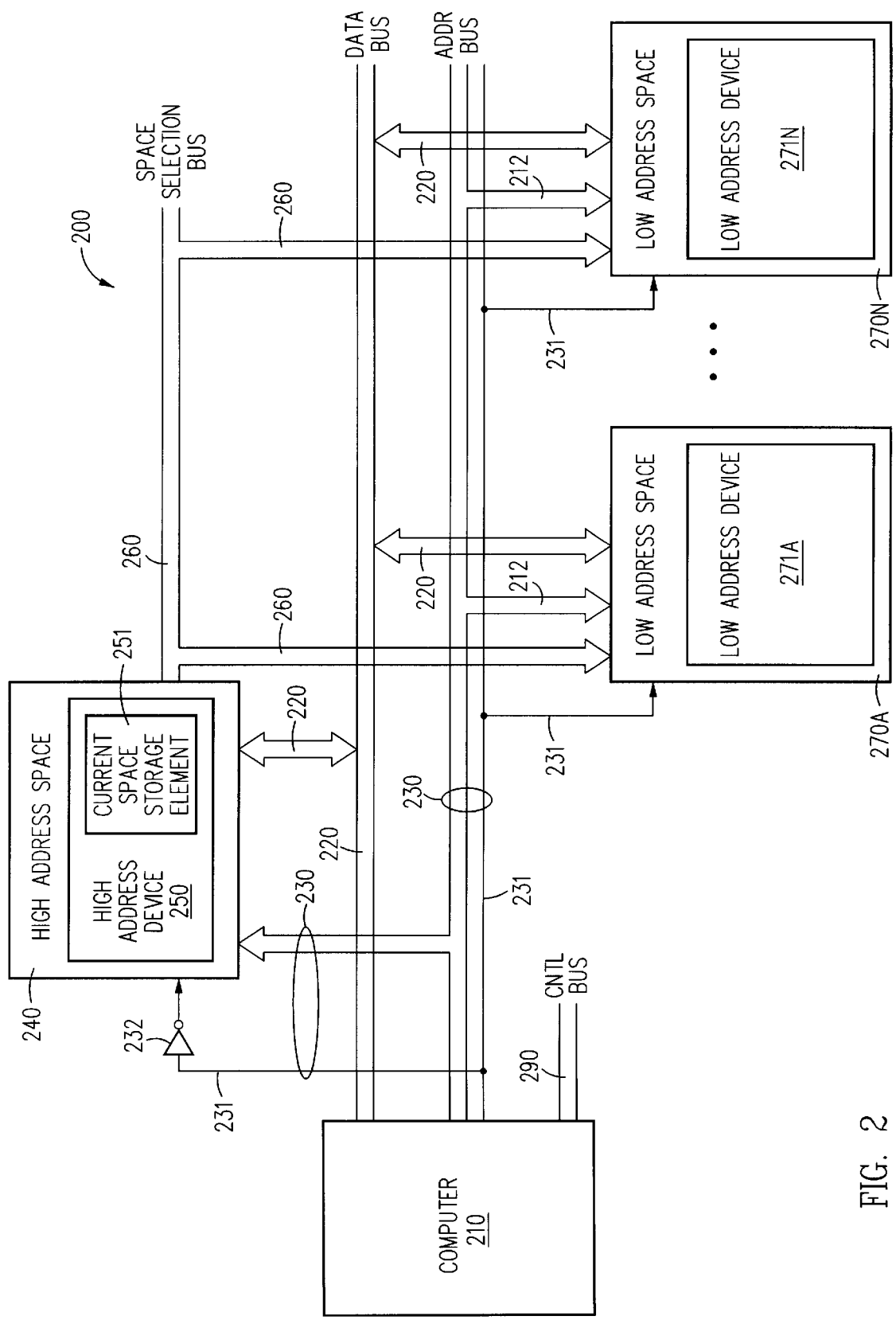
FIG. 2 illustrates a computer system of this invention that uses stored signals to switch between mutually exclusive low address spaces.
Figure 3:
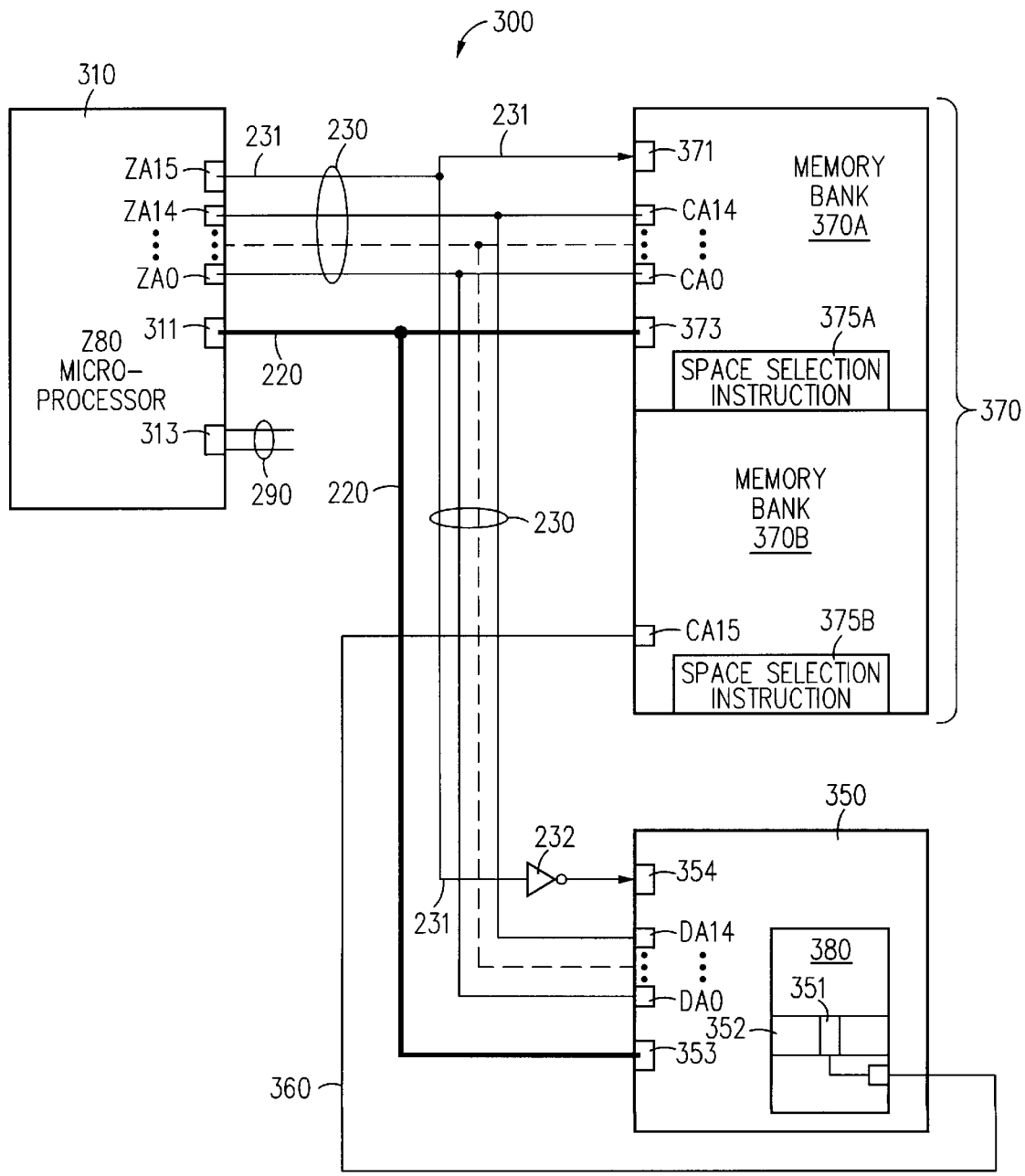
FIG. 3 illustrates one specific embodiment of the computer system of FIG. 2 wherein the low address spaces are occupied by two memory banks in a single memory chip.

FIG. 3 illustrates a microprocessor system 300, that is one specific variant of the embodiment illustrated in FIG. 2. Many of the reference numerals in FIG. 3 are derived from corresponding reference numerals in FIG. 2 that indicate similar components.

Microprocessor system 300 includes a microprocessor 310, such as Zilog Z80, having sixteen address terminals ZA15–ZA0, that are coupled to the respective sixteen lines (not all shown) in address bus 230. Highest address line 231 in address bus 230 couples microprocessor address terminal ZA15 in the first manner to a chip select terminal 354 of an application specific integrated circuit (ASIC) 380, and in the second manner to a chip select terminal 371 of a memory chip 370. The signals at chip select terminals 354 and 371 are both active low signals in this variant. Other address lines in address bus 230 directly connect the fifteen microprocessor address terminals ZA0–ZA14 to the corresponding address terminals CA0–CA14 of memory chip 370, and to the corresponding address terminals DA0–DA14 of ASIC 380.

Therefore, microprocessor 310 drives a signal at a first state, e.g. low, or at a second state, e.g. high, on the microprocessor address terminal ZA15, to respectively access low addresses 0000h–7FFFh that address a memory chip 370, or high addresses 8000h–FFFFh that form data space 350.

Microprocessor 310 retrieves data signals from, and stores data signals in, data space 350 in which are located various devices, such as input-output devices (not shown), random-access-memory (not shown), and ASIC 380. ASIC 380 includes a current-space bit 351 formed in a register 352 and coupled by space selection line 360 to memory chip address terminal CA15.

Memory chip 370 has a number of storage locations, 64K bytes in this specific embodiment, organized into two memory banks, also referred to as code banks 370A and 370B, that are encoded with a majority of the program instructions executed by microprocessor 310. Code banks 370A and 370B both occupy the same low addresses 0000h–7FFFh in two mutually exclusive address spaces. Only one of code banks 370A and 370B responds to address signals at address terminals CA0–CA14, depending on the signal on address terminal CA15.

On power up, microprocessor 310 drives a second state signal on address terminal ZA15 to retrieve instructions from memory chip 370, and current-space bit 351 drives a signal at a third state, e.g. low, so that code bank 370A supplies the instructions for microprocessor 310. In this embodiment, the storage elements in code bank 370A are insufficient in number to store all the instructions for microprocessor 310. So, code bank 370A is encoded with a space selection instruction at an appropriate location to change the signal stored in current-space bit 351. After execution of the space selection instruction, microprocessor 310 switches to retrieval of instructions from code bank 370B, until another space selection instruction is executed.

For example, on power up microprocessor 310 executes, as illustrated by arrow 401 (FIG. 4), program instructions 420A encoded in the storage elements between addresses qqq1 and zzz0. Then, microprocessor 310 executes a jump, as illustrated by dotted arrow 402, to retrieve a space selection instruction from a select-instruction storage element 375A at address xxx0. Then microprocessor 310 executes the space selection instruction, and sets current-space bit 352 to high to thereby switch instruction retrieval from code bank 370A to code bank 370B.

Prior to execution of the space selection instruction, microprocessor 310 can execute one or more housekeeping instructions. For example, microprocessor 310 can make a local copy of the signal to-be-updated as follows (in Z80 assembly language):

| | |
|---|---|
| ld | A, (c_PNP_AD) |
| or | 80h |
| ld | (c_PNP_AD), A |
| ld | (PNP_AD), A | where PNP_AD is the address of register 352 in ASIC 380 that contains current-space bit 351, and c_PNP_AD is the address of a copy of register 352. In this particular embodiment, a copy of register 352 is maintained because register 352 is not a readable register and has various bits that need to be read by other tasks.

The instruction "or 80h" sets the last bit in microprocessor 310's register A to high. The instruction "ld (c_PNP_AD), A" updates the copy of register 351.

Then, during execution of the space selection instruction "ld (PNP_AD), A" microprocessor 310 drives a signal low, on address terminal ZA15, drives address signals indicative of current-space bit 351, on address terminals ZA0–ZA14, and also drives register A's signals on data bus 220 to store a high signal in current-space bit 351. Hence, as shown by dotted arrow 403, the instruction "ld (PNP_AD), A" updates the current-space bit 352 to high, so that space selection line 360 (FIG. 3) starts indication of second code bank 370B as the current code bank.

Thereafter, microprocessor 310 retrieves instructions from second code bank 370A. Specifically, an instruction pointer (not shown) in microprocessor 310 increments, and microprocessor 310 retrieves the next instruction from the storage element at address xxx1. In this embodiment, a "nop" instruction is encoded in the storage location at address xxx1 in each of the code banks 370A and 370B, to account for any delay in update of current-space bit 351 after execution of the space selection instruction.

Then, as shown by arrow 404, microprocessor 310 executes the instruction "jp ppp1", encoded in the storage location at address xxx2 in code bank 30B. Therefore, microprocessor 310 then fetches the next instruction from the storage locations at address ppp1, as illustrated by the dotted arrow 405. Specifically, microprocessor 310 executes, as illustrated by the arrow 406, program instructions 420B encoded in storage elements between addresses ppp1 and zzz1.

Then, microprocessor 310 executes a jump, as illustrated by dotted arrow 407 to retrieve a different space selection instruction from select-instruction storage element 375B at address yyy0. Execution of the space selection instruction "rst CS" resets the current-space bit 352 to low, and thereby switches the currently accessed code bank from code bank 370B to code bank 370A. Delay in the reset, i.e. update of current-space bit 351 is illustrated by execution of the instruction "nop" encoded in the storage location at address yyy1 of code bank 370B, as illustrated by arrow 408.

Thereafter, microprocessor 310 retrieves instructions from first code bank 370A, for example, from address yyy2. Microprocessor 310 then continues execution of program instructions 450 retrieved from address yyy3 and the following addresses in code bank 370A.

Code banks 370A and 370B also include a number of storage elements encoded with fault handling instructions 430A and 430B respectively that are executed, for example, on occurrence of a fault during execution of a space selection instruction. For example, if execution of the space selection instruction retrieved from storage element 375A fails to switch to code bank 370B, as shown by arrow 410, microprocessor 310 executes the instruction "jp xxx3." Specifically, fetches the instruction from address xxx3, which is the first fault handling instruction, as shown by dotted arrow 411.

Next, as shown by arrow 412, fault handling instructions 430A are executed, for example, to set an error bit (not shown), and if a retry bit (not shown) is set, to again execute the space selection instruction from address xxx0 and attempt to switch to code bank 370B. Fault handling instructions 430A can include incrementing a retry counter (not shown) that indicates the number of retrys, and when the retry counter exceeds a predetermined retry limit, to display an error message and go to an idle state.

Use of a stored signal to switch code banks allows an interrupt service routine (ISR) to be encoded in only a first code bank and not in the other code banks. So, if an interrupt occurs in a code bank other than the first code bank, a space selection instruction is used to switch to the first code bank and service the interrupt. On completion of an interrupt service routine, another space selection instruction is used to switch back to the code bank in which the interrupt occurred.

Figure 5:
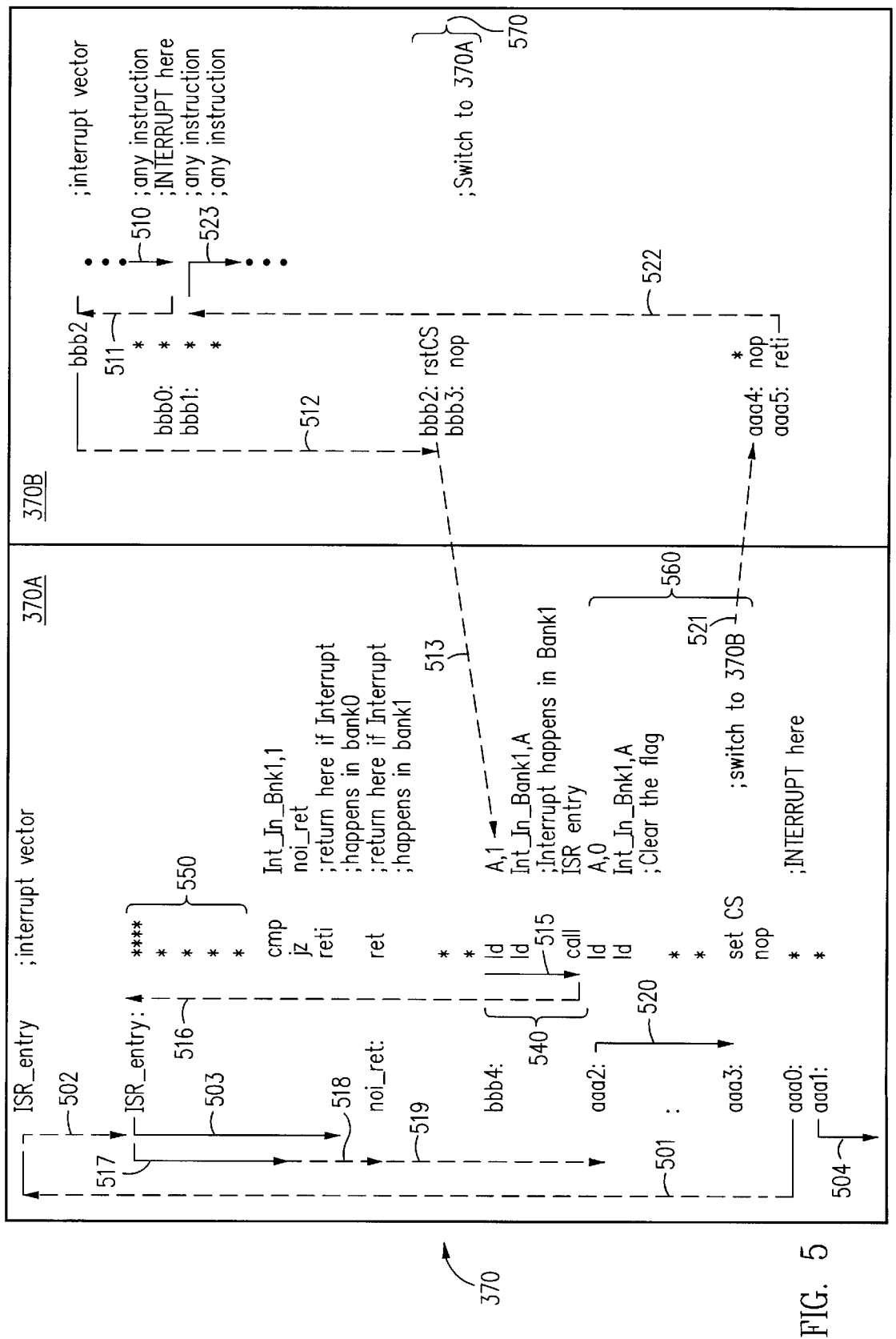
FIG. 5 illustrates an interrupt service routine (ISR) and interrupt passing instructions encoded in storage elements of the two memory banks illustrated in FIG. 3.

In this embodiment, only the first code bank 370A is encoded with an interrupt service routine 550 (FIG. 5) for handling an interrupt, such as an interrupt generated by a peripheral device, for example, a keyboard (not shown). On occurrence of the interrupt during execution of, for example an instruction retrieved from address aaa0 in code bank 370A, microprocessor 310 handles the interrupt normally, as follows.

Microprocessor 310 saves the next address aaa1 on a stack (not shown) in data space 350 (FIG. 3), looks up the interrupt vector as shown by dotted arrow 501 (FIG. 5), and jumps to interrupt service routine 550, as shown by dotted arrow 502. Next, microprocessor 310 executes the interrupt service routine 550, for example to initialize flags and counters, determines that the interrupt did not occur during execution of an instruction from code bank 370B, and then executes the instruction "reti" as shown by arrow 503. Then microprocessor 310 resumes execution, for example, retrieves the next instruction from address aaa1 popped from the stack, and the instructions following address aaa1, as shown by arrow 504.

At some time thereafter, microprocessor 310 switches banks to retrieve and execute instructions from the second code bank 370B as described above in reference to FIG. 4. Second code bank 370B (FIG. 5) is not encoded with interrupt service routine 550 for handling the interrupt. Rather, second code bank 370B is encoded with interrupt passing instructions 570 that include a space selection instruction to switch to the first code bank 370A. Therefore, on occurrence of the interrupt during execution of, for example an instruction retrieved from address bbb0 in the second code bank 370B as shown by arrow 510, microprocessor 310 switches to first code bank 370A, executes interrupt service routine 550 and resumes execution of instructions in the second code bank 370B.

Specifically, microprocessor 310 saves the next address bbb1 on the stack, looks up the interrupt vector as shown by dotted arrow 511, and jumps to interrupt passing instructions 570, as shown by dotted arrow 512. Interrupt passing instructions 570 include a space selection instruction at address bbb2 that switches execution to code bank 370A. Then, as shown by arrow 515, microprocessor 310 executes the interrupt entry instructions 540 in code bank 370A starting at address bbb4 that is located numerically after address bbb2. Note that addresses bbb4 and bbb2 are in different banks 370A and 370B respectively, although numerically related to each other, for example, bbb4=bbb2+2.

The interrupt entry instructions 540 include an instruction to set a bit Int_In_Bnk1 in data space 350 (FIG. 3) to indicate that the interrupt occurred in the second code bank 370B. Then, as illustrated by dotted arrow 516, microprocessor 310 saves the next address aaa2 on the stack and jumps to interrupt service routine 550, as illustrated by arrow 517. At the end of execution of interrupt service routine 550, microprocessor 310 finds the bit Int_In_Bnk1 set and executes a return, as shown by dotted arrow 518.

Next, as shown by dotted arrow 519, microprocessor 310 returns to address aaa2 popped from the stack, and executes interrupt exit instructions 560, to clear the bit Int_In_Bnk1 and execute a space selection instruction from address aaa3 that switches to code bank 370B, as shown by arrow 521. Microprocessor 310 then executes the instruction "reti" retrieved from code bank 370B at address aaa5 that is located numerically after address aaa3, and as shown by arrow 522 goes to the instruction from address bbb1 popped from the stack. At this point, service of the interrupt is completed, and as shown by arrow 523, microprocessor 310 resumes execution of instructions in the second code bank 370B.

Use of the space selection instruction as described above eliminates the need to encode redundant interrupt service routines in each memory bank, thus saving memory, while handling interrupts in real time.

Although handling of only one interrupt has been discussed above in reference to FIG. 5, other interrupts can also be handled similarly if the corresponding interrupt service routines are encoded in code bank 370A, and corresponding interrupt passing instructions are encoded in code bank 370B or vice versa. Use of such interrupt passing instructions saves memory, especially when there are more than two banks and interrupt service routines encoded in only one bank.

In one specific variant of the embodiment, microprocessor 310 transfers software code to a digital signal processing (DSP) chip. Such code transfer takes a large amount of time and microprocessor 310 is needed for other tasks during the same time. Therefore, microprocessor 310 is time shared between other tasks and the code transfer task.

Specifically, microprocessor 310 performs a number of iterations, and in each iteration transfers only a portion of the code, and then executes other task instructions, such as a polling instruction, that are unrelated to the code transfer instructions. FIGS. 6A–6C illustrate code banks 370A and 370B encoded with instructions for transfer of code to the digital signal processing (DSP) chip.

At the beginning of an iteration at address "loop" in FIG. 6A, microprocessor 310 checks if software for the DSP chip has been loaded, or whether the DSP chip malfunctions, as shown by arrow 651. Then microprocessor 310 saves the address "adsp_idle" on the stack and calls the function at address "load_adsp", as illustrated by dotted arrow 652.

At address "load_adsp", microprocessor 310 disables interrupts, saves the address of function "adsp_idle" on the stack, and calls function "ld_adsp_init" if bit ADSP_LOADING is FALSE which indicates that this is the first iteration for transfer of the DSP code.

In function "ld_adsp_init", microprocessor 310 initializes certain pointers (not shown). Then, microprocessor 310 executes the space selection instruction "set CS", switches to code bank 370B as shown by dotted arrow 654, and executes the instruction "jmp tx" as shown by arrow 655. Next, microprocessor 310 transmits a predetermined amount of data, increments a counter, and sets bit ADSP_LOADED if code transfer is complete, as shown by arrow 656.

Microprocessor 310 then executes another space selection instruction "reset CS", and as shown by arrow 657, switches to code bank 370A. In code bank 370A, microprocessor 310 executes the instruction "ret" that continues execution at address "adsp_idle" popped from the stack. At this point, microprocessor 310 executes other task instructions, different from the DSP code transfer instructions, as illustrated by arrow 658. Then microprocessor 310 continues transfer of DSP code by going back to the address "loop", as illustrated by arrow 659.

Microprocessor 310 iterates the above-described steps as often as necessary to transmit all of the code needed by the DSP chip. Such transfer of only a portion of code during each iteration allows microprocessor 310 to perform multitasking, e.g. execute other tasks, such as an error checking task, between two iterations.

In this variant of the embodiment, four types of interrupts are handled by four different methods. In the first method, a first type of interrupt, such as a non-maskable interrupt, is handled by resetting corresponding flags as illustrated in FIG. 6A, processing the interrupt and restarting the transfer of the DSP code.

Specifically, if a nonmaskable interrupt (NMI) occurs during execution of an instruction retrieved from code bank 370A, microprocessor 310 executes NMI interrupt processing instructions 610 (FIG. 6A) from address "NMI_Handle". Then microprocessor 310 goes to address "adsp_idle", executes instructions unrelated to DSP code transfer, as noted above, and then restarts iteration from the address "loop." Therefore, microprocessor 310 does not resume executing instructions that were interrupted, and instead, restarts the DSP code transfer iterations.

If the NMI interrupt occurs during execution of an instruction retrieved from the second code bank 370B, microprocessor 310 pushes the next address on the stack, and jumps to the NMI interrupt passing instructions at location 0066h in code bank 370B. Then microprocessor 310 disables all interrupts with the instruction "di", pushes address "adsp_idle" on the stack and initializes certain bits used in DSP code transfer, such as bits ADSP_LOADING, ADSP_LOADED and ADSP_FAIL in register adsp_status, as shown by arrow 610.

Microprocessor 310 then jumps to address "nmi_out", executes housekeeping instructions of the type described above, and executes the space selection instruction to switch to code bank 370A. Then, microprocessor 310 jumps to the address "NMI_Handle", as shown by arrow 611 to execute NMI interrupt processing instructions 660. At the end of NMI interrupt processing instructions 660, microprocessor 310 executes instruction "retn" to pop the address "adsp_idle" from the top of the stack. Microprocessor 310 then executes other instructions, and goes to address "loop" to restart the iterations for the DSP code transfer.

In the second method, a second type of interrupt, such as a reset interrupt generated by, for example, pressing the CTRL, ALT and DEL keys simultaneously on a keyboard, is handled by processing the interrupt and restarting the transfer of the DSP code, as illustrated in FIG. 6B. Specifically, on occurrence of a reset interrupt during execution of instructions in code bank 370B, microprocessor 310 executes interrupt passing instructions 630 as shown by arrow 611, switches to code bank 370A as shown by arrow 612, jumps to address 0000h as shown by arrow 613, and executes the same interrupt processing instructions 670 as would have been executed if the reset interrupt occurred during execution of instructions retrieved from code bank 370A.

In the third method, a third type of interrupt is simply ignored, if the interrupt occurs during execution of any instructions from code bank 370B, as illustrated in FIG. 6C. Specifically, code bank 370B includes a number of storage locations 690 that are encoded with the interrupt ignoring instruction "reti" that simply returns to continue execution of the interrupted instructions.

In the third method, if the interrupt occurs during execution of any instructions in code bank 370A, the interrupt is serviced in the normal manner by execution of interrupt processing instructions 670 (as described above).

In the fourth method, if an interrupt occurs during execution of instructions in code bank 370B, the microprocessor 310 switches to code bank 370A to process the interrupt as described above in reference to FIG. 5. In the fourth method, if the interrupt occurs during execution of instructions in code bank 370A, the interrupt is serviced in the normal manner.

Figure 4:
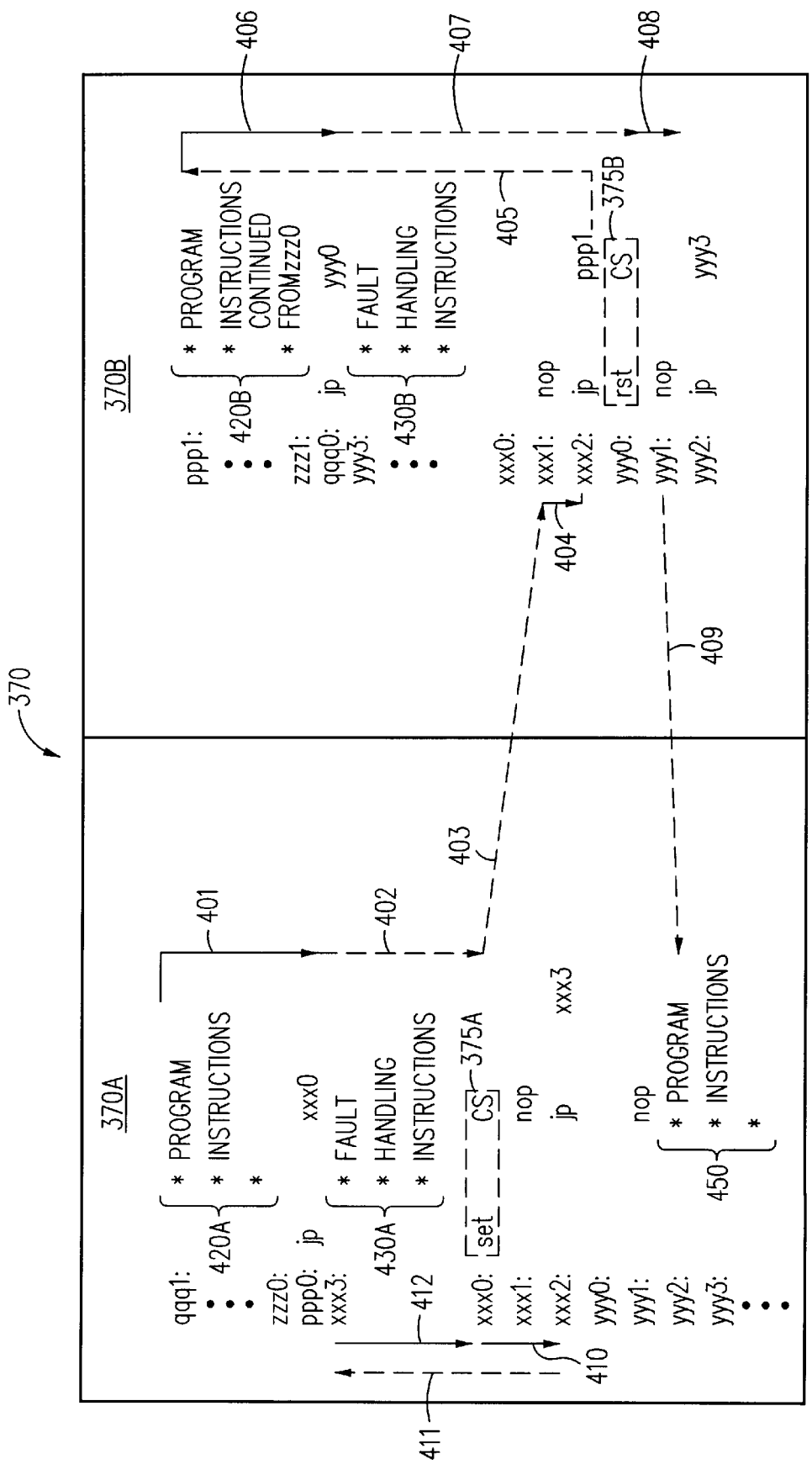
FIG. 4 illustrates program instructions encoded in storage elements of the two memory banks illustrated in FIG. 3.

In this embodiment, bit ADSP_LOADING, when set, indicates that DSP code transfer is in progress, and function load_adsp iterates to continue the DSP code transfer. Bit ADSP_LOADED is set when all the DSP code has been transferred. Bit ADSP_FAIL is set if the DSP code transfer was not completed, for example due to a hardware failure, and in such a case certain fault handling instructions may be executed, similar to instructions 430A and 430B (FIG. 4).

Although certain illustrative embodiments have are described herein, numerous adaptations and modifications of the invention will be apparent to those skilled in the art in view of the disclosure. For example, the signals on low address lines and high address lines of an address bus can be interchanged to create a number of high address spaces and a single low address space containing the current space storage element. Moreover, the specific address location of the banks is not a critical aspect of the invention. Any combination of banks can be formed in accordance with this invention.

Various modifications and adaptations of the above described embodiments are encompassed by the attached claims.

We claim:

1. An apparatus comprising:
   a microprocessor having a plurality of microprocessor data terminals and a plurality of microprocessor address terminals;
   a data bus coupled to said microprocessor data terminals;
   an address bus comprising a plurality of address lines, each address line coupled to one of said microprocessor address terminals, said plurality of address lines comprising at least one high address line;
   a first device comprising:
      a plurality of first data terminals coupled to said data bus;
      a plurality of first address terminals coupled to said address lines other than said high address line;
      a first chip-select terminal coupled in a first manner to said high address line; and
      a current-space storage element accessible through said data bus;
   a plurality of second devices, at least one second device comprising:
      a plurality of data terminals coupled to said data bus;
      a second chip-select terminal coupled in a second manner to said high address line;
      a plurality of address terminals grouped into a low address group and a high address group, said high address group comprising at least one address terminal, each address terminal in said low address group being coupled to an address line other than said high address line; and
      a select-instruction storage element accessible through said data bus; and
   a space selection line coupled to said current-space storage element of said first device and to an address terminal in the high address group of a second device.

2. The apparatus of claim 1:
   wherein said second device consists essentially of only two memory banks; and
   further wherein the high address group in each of said memory banks consists essentially of only one address terminal.

3. The apparatus of claim 2 wherein said two memory banks are formed together in a single memory chip having a single memory chip-select terminal coupled in said second manner to said high address line.

4. The apparatus of claim 3:
   wherein said high address line is directly coupled to said memory chip, the coupling between said high address line and said memory chip being permanent and devoid of a logic element; and
   further wherein said high address line is coupled through an inverter to said first device, the coupling between said high address line and said first device being permanent and devoid of a logic element.

5. The apparatus of claim 3 wherein said space selection line is connected only to said first device and to said memory chip.

6. The apparatus of claim 2 wherein each of said memory banks stores only instructions and is devoid of any data.

7. The apparatus of claim 1 wherein said first device is devoid of a circuit capable of storing a signal in said current-space storage element.

8. The apparatus of claim 7 wherein said current-space storage element is accessible for storage only through said data bus.

9. An apparatus comprising:
a microprocessor having a plurality of microprocessor data terminals and a plurality of microprocessor address terminals;
a data bus coupled to said microprocessor data terminals;
an address bus comprising a plurality of address lines, each address line coupled to one of said microprocessor address terminals, said plurality of address lines comprising at least one high address line;
a first device comprising:
a plurality of first data terminals coupled to said data bus;
a plurality of first address terminals coupled to said address lines other than said high address line;
a first chip-select terminal coupled in a first manner to said high address line; and
a current-space storage element accessible through said data bus;
a plurality of second devices, at least one second device comprising:
a plurality of data terminals coupled to said data bus;
a second chip-select terminal coupled in a second manner to said high address line;
a plurality of address terminals grouped into a low address group and a high address group, said high address group comprising at least one address terminal, each address terminal in said low address group being coupled to an address line other than said high address line; and
a select-instruction storage element accessible through said data bus; and
a space selection line coupled to said current-space storage element of said first device and to an address terminal in the high address group of a second device;
wherein each select-instruction storage element is encoded with at least one space selection instruction; and
further wherein said microprocessor is capable of executing a first space selection instruction retrieved from one of said select-instruction storage elements to store an active space selection signal in said current-space storage element, and a second device responds to signals on said address bus, only if an address terminal in said high address group of said second device has an active space selection signal.

10. The apparatus of claim 9 wherein said first space selection instruction is retrieved from a second device different from said responsive second device.

11. The apparatus of claim 10 consisting essentially of only a pair of second devices, wherein only said different second device can respond to said address signals when said space selection line has an inactive space selection signal.

12. The apparatus of claim 11 wherein said inactive space selection signal is stored by said microprocessor in said current-space data storage element on execution of space selection instruction retrieved from said different second device.

13. The apparatus of claim 11 wherein each of said second devices comprises a memory bank, and wherein a first memory bank is responsive to said address signals when said space selection signal is inactive, and further wherein a second memory bank is responsive to said address signal when said space selection signal is active.

14. The apparatus of claim 13:
wherein only said first memory bank is encoded with a plurality of interrupt processing instructions; and
further wherein said second memory bank is encoded with an interrupt passing instruction for storing an inactive signal in said current-space storage element in response to an interrupt during execution of an instruction retrieved from said second memory bank to allow said interrupt to be handled by said interrupt processing instructions.

15. A method for accessing memory:
retrieving a first instruction from a first address space at least by passing a bit of an address signal to a first chip select terminal;
executing said first instruction;
storing an active space selection signal in a current-space storage element at least by passing said bit to a second chip select terminal; and
retrieving a second instruction from a second address space indicated by said active space selection signal at least by passing said bit to a third chip select terminal.

16. The method of claim 15 further comprising:
executing a third instruction retrieved from said second address space and storing an inactive space selection signal in said storage element; and
retrieving a fourth instruction from said first address space indicated by said inactive space selection signal.

17. A method for accessing a first address space and a second address space mutually exclusive with said first address space, said method comprising:
using a storage element located in a third address space to indicate one of said first and second address spaces;
responding to an interrupt during execution of an instruction retrieved from said second address space by retrieving an instruction for changing said storage element's signal indicative of said second address space to a signal indicative of said first address space;
passing a bit of an address signal to a chip select terminal during said retrieving; and
executing an interrupt processing instruction retrieved from said first address space.

18. The method of claim 17 wherein said changing instruction is retrieved from said second address space in response to said interrupt.

19. The method of claim 17 wherein said interrupt is a nonmaskable interrupt.

20. The apparatus of claim 9 wherein:
said second device consists essentially of only two memory banks; and
the high address group in each of said memory banks consists essentially of only one address terminal.

21. The apparatus of claim 20 wherein:
said two memory banks are formed together in a single memory chip having a single memory chip-select terminal coupled in said second manner to said high address line.

22. The apparatus of claim 21 wherein:
said high address line is directly coupled to said memory chip; and said high address line is coupled through an inverter to said first device.

23. The apparatus of claim 21 wherein:

said space selection line is connected only to said first device and to said memory chip.

24. The apparatus of claim 20 wherein:

each of said memory banks stores only instructions and is devoid of any data.

25. The apparatus of claim 9 wherein:

said first device is devoid of a circuit capable of storing a signal in said current-space storage element.

26. The apparatus of claim 25 wherein:

said current-space storage element is accessible for storage only through said data bus.

27. The apparatus of claim 1, wherein:

said first chip-select terminal is permanently connected in said first manner to said high address line; and said second chip-select terminal is permanently coupled in said second manner to said high address line; and said second manner is mutually exclusive with respect to said first manner.

28. The apparatus of claim 1 being devoid of a logic element coupled to one of said chip-select terminals.

* * * * *